(12) United States Patent
Phuah et al.

(10) Patent No.: US 8,788,932 B1
(45) Date of Patent: Jul. 22, 2014

(54) METHODS AND SYSTEMS FOR PROVIDING WEB PAGES TO WEB BROWSERS

(75) Inventors: Vincent Phuah, Waltham, MA (US); James Edward Paschetto, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 2056 days.

(21) Appl. No.: 10/714,324

(22) Filed: Nov. 14, 2003

(51) Int. Cl.
*G06F 17/00* (2006.01)

(52) U.S. Cl.
USPC .......................................... 715/234; 715/200

(58) Field of Classification Search
USPC .............................. 715/200, 234–235; 705/14
See application file for complete search history.

(56) References Cited

U.S. PATENT DOCUMENTS

| | | | |
|---|---|---|---|
| 5,999,912 A * | 12/1999 | Wodarz et al. ................. | 705/14 |
| 6,128,651 A * | 10/2000 | Cezar ............................ | 709/217 |
| 6,339,761 B1 * | 1/2002 | Cottingham ................... | 705/14 |
| 6,442,529 B1 * | 8/2002 | Krishan et al. ................ | 705/14 |
| 6,487,538 B1 * | 11/2002 | Gupta et al. ................... | 705/14 |
| 6,826,614 B1 * | 11/2004 | Hanmann et al. ............. | 709/227 |
| 7,103,904 B1 * | 9/2006 | Blackketter et al. .......... | 725/32 |
| 2002/0007419 A1 * | 1/2002 | Chang et al. .................. | 709/232 |
| 2002/0010626 A1 * | 1/2002 | Agmoni ......................... | 705/14 |
| 2002/0036654 A1 * | 3/2002 | Evans et al. ................... | 345/744 |
| 2002/0072972 A1 * | 6/2002 | Lamont ......................... | 705/14 |
| 2002/0077900 A1 * | 6/2002 | Thompson et al. ............ | 705/14 |
| 2002/0143627 A1 * | 10/2002 | Barsade et al. ................ | 705/14 |
| 2002/0194070 A1 * | 12/2002 | Totham et al. ................. | 705/14 |
| 2003/0009762 A1 * | 1/2003 | Hooper et al. ................. | 725/91 |
| 2003/0048294 A1 * | 3/2003 | Arnold .......................... | 345/738 |
| 2005/0096983 A1 * | 5/2005 | Werkhoven .................... | 705/14 |

* cited by examiner

*Primary Examiner* — Manglesh M Patel (57) ABSTRACT

Methods and systems described herein can allow for a service provider, such as an Internet Service Provider (ISP) to provide Web pages to users' Web browsers at periodic intervals. The content can include graphics, text, audio and video clips. In contrast to the traditional banner or pop-up advertisements available today, the methods and systems can allow content Web pages to be displayed on users' Web browsers without the user requesting specific Web sites. The ISPs can become distributors of advertising content, potentially gaining new revenue streams.

31 Claims, 3 Drawing Sheets

METHODS AND SYSTEMS FOR PROVIDING WEB PAGES TO WEB BROWSERS

FIELD

The systems and methods relate to displaying web pages, and more particularly to providing web pages to web browsers.

BACKGROUND

The concept of advertising on the Internet is well known. Since the inception of Internet portal Web sites, popular portals have used banner and pop-up ads as a source of revenue. The main goal of such Internet portal Web sites can be to attract large numbers of users to access their Web sites. Advertisers can pay the Internet portals based on the number of times an advertisement, or ad is displayed to the users accessing their Web sites, known in the art as impressions.

Thus, an advertiser can rely on users accessing the portal Web sites to have the ads seen by the users. Since different users can access different portals, an advertiser can place ads with a number of Internet portals in order to get the advertising message across to a large Internet user population. However, there remain portals that do not support advertising and an advertiser can miss the segment of the Internet population using such portals.

SUMMARY

Methods and systems can allow for a service provider to provide content Web pages to users' Web browsers at periodic intervals. The content Web pages can include graphics, text, audio and video clips. In contrast to the traditional banner or pop-up ads available today, the methods and systems can allow content Web pages to be displayed on users' Web browsers without the user requesting specific Web sites. The service providers can become distributors of content, such as advertising, potentially gaining new revenue streams.

In one embodiment, a method of providing a Web page to a Web browser can include receiving a request for a first Web page, retrieving a content Web page, sending the content Web page to the browser for display on the browser for a predetermined period, retrieving the first Web page when the predetermined period is exceeded, and sending the first Web page to the browser for display. The method can include saving the request and retrieving the stored request to determine retrieval information for retrieving the first Web page. The content Web page can replace the Web page displayed by the browser, or can overlay the Web page displayed by the browser in the manner of known pop-up displays.

The method can include retrieving and sending the content Web page based on whether the request is received during a content interval. When the first Web page is retrieved after retrieving and sending the content Web page, the content interval can be reset. An indication of the status of the content interval can be provided to the browser. The method can include retrieving and sending the content Web page when the first Web page is not exempted. In one aspect, the method can include retrieving and sending the content Web page if the first Web page is non-exempt and/or if the request is received during a content interval.

The method can include selecting a template form for the content Web page to generate the content Web page. Configuration data can be obtained from users and the template form can be selected based on the configuration data obtained. The method can include determining when the predetermined period is exceeded based on a triggering event, including such events as completion of a presentation on the content Web page, selection of an action specified on the content Web page, and the expiration of a specified time period. Triggering data can be obtained from the triggering event and can be incorporated with the configuration data.

In one embodiment, computer-readable medium can contain instructions for controlling a computer system to provide a Web page to a Web browser by controlling the computer system to receive a request for a first Web page, retrieve a content Web page, send the content Web page to the browser for display of the content Web page for a predetermined period, retrieve the first Web page when the predetermined period is exceeded, and send the first Web page to the browser for display.

The instructions can include instructions to save and store the request and retrieve the stored request to determine retrieval information for retrieving the first Web page. The instruction can control the computer system to determine when the predetermined period is exceeded based on a triggering event. The triggering event can include one or more events, such as completion of a presentation on the content Web page, selection of an action specified on the content Web page, and expiration of a specified time period.

The instructions can include controlling the computer system to retrieve and send the content Web page if the first Web page is non-exempt and/or if the request is received during a content interval. The instructions can control the computer system to provide an indication of a status of the content interval to the browser for display. In addition, the instructions can control the computer system to obtain user configuration data, and select a template form for the content Web page based on the configuration data. Data obtained from the triggering event can be incorporated with the configuration data. The instructions to send the content Web page can include instructions to replace a Web page displayed by the browser with said content Web page, or to overlay the content Web page on the Web page displayed by the browser.

In one embodiment, a Web-based server application on computer-readable medium can include instructions to provide content Web pages to a Web browser at predetermined intervals by determining if a request for a first Web page from the Web browser is received during the predetermined interval, obtaining a template form when the request is received during the predetermined interval, generating a content Web page from the template form, sending the content Web page to the Web browser for display of the content Web page for a predetermined period, retrieving the first Web page when the predetermined period is exceeded, and sending the first Web page to the Web browser for display.

The application can include instructions to determine when the predetermined period is exceeded based on a triggering event. The triggering event can include events such as completion of a presentation on the content Web page, selection of an action specified on the content Web page, and expiration of a specified time period. The application can generate the content Web page by obtaining user configuration data, and selecting a template form for the content Web page based on the configuration data. Data from the triggering event can be incorporated with the configuration data.

In one embodiment, a method of providing Web pages can include receiving a request for a first Web page, determining if the request is received during a predetermined interval, retrieving a content Web page when the request is received during the predetermined interval, providing the content Web page in response to the request when the request is received during the predetermined interval, receiving an indication that the display of the content Web page is complete, and providing the first Web page upon receipt of the indication.

The indication can include completion of a presentation on the content Web page, selection of an action specified on the content Web page, and expiration of a specified time period. The method can include providing a status indication relative to the predetermined interval to the browser for display. The method can include obtaining user configuration data, and selecting a template form for the content Web page based on the configuration data.

In one embodiment, a system for advertising over a network can include a proxy server connected to the network to receive requests from a network user to access a requested site on the network, a plurality of template forms for the advertising, determining means to determine if the request is received within a predetermined interval, generating means to generate an advertising site from one of the template forms and to present the advertising site to the user when the request is received within the predetermined interval, tracking means to monitor the presentation of the advertising site and to determine when the presentation is complete, and processing means to present the requested site to the user when the presentation is complete. The system can include windowing means to present a status indication relative to the predetermined interval to the user.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Figure 3A:
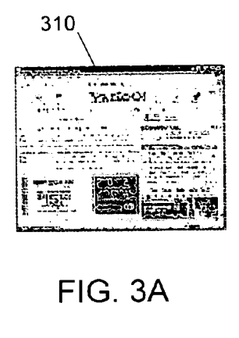
FIGS. 3A-3C illustrate a series of screen images on a Web browser.
Figure 3B:
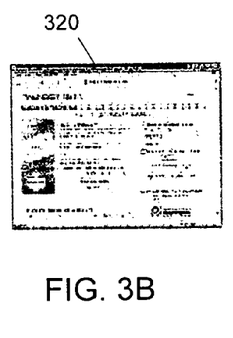
Figure 3C:
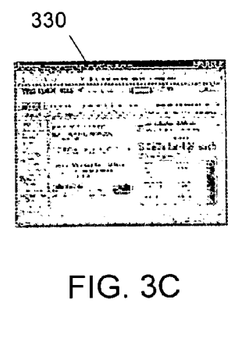

The methods and systems described herein can be used to provide Web pages to a user's Web browser at selected time intervals. In one embodiment, the Web pages provided can include advertisement Web pages, though it can be understood that other Web pages can be provided, e.g., user notices, system messages, etc. FIGS. 3A-3C illustrate an exemplary sequence of screen images, labeled screens 310, 320 and 330, that a service provider, such as an Internet Service Provider (ISP) can present to a user based on the user's request to view the Web pages shown in the screen images. The screen images 310, 320 and 330 in FIGS. 3A-3C are intentionally shown blurred to illustrate Web pages without disclosing the actual content thereof.

The Web pages can be provided by or accessed from a variety of servers on the Internet. References herein to the Internet can accordingly be understood to include portions thereof, including but not limited to intranets, local area networks (LANs), wide area networks (WANs), etc. Further, references herein to a service provider or ISP can be understood to include other such entities capable of performing the aspects of the disclosed methods and systems attributable herein to an ISP, e.g., system administrators, network servers, etc.

Figure 1:
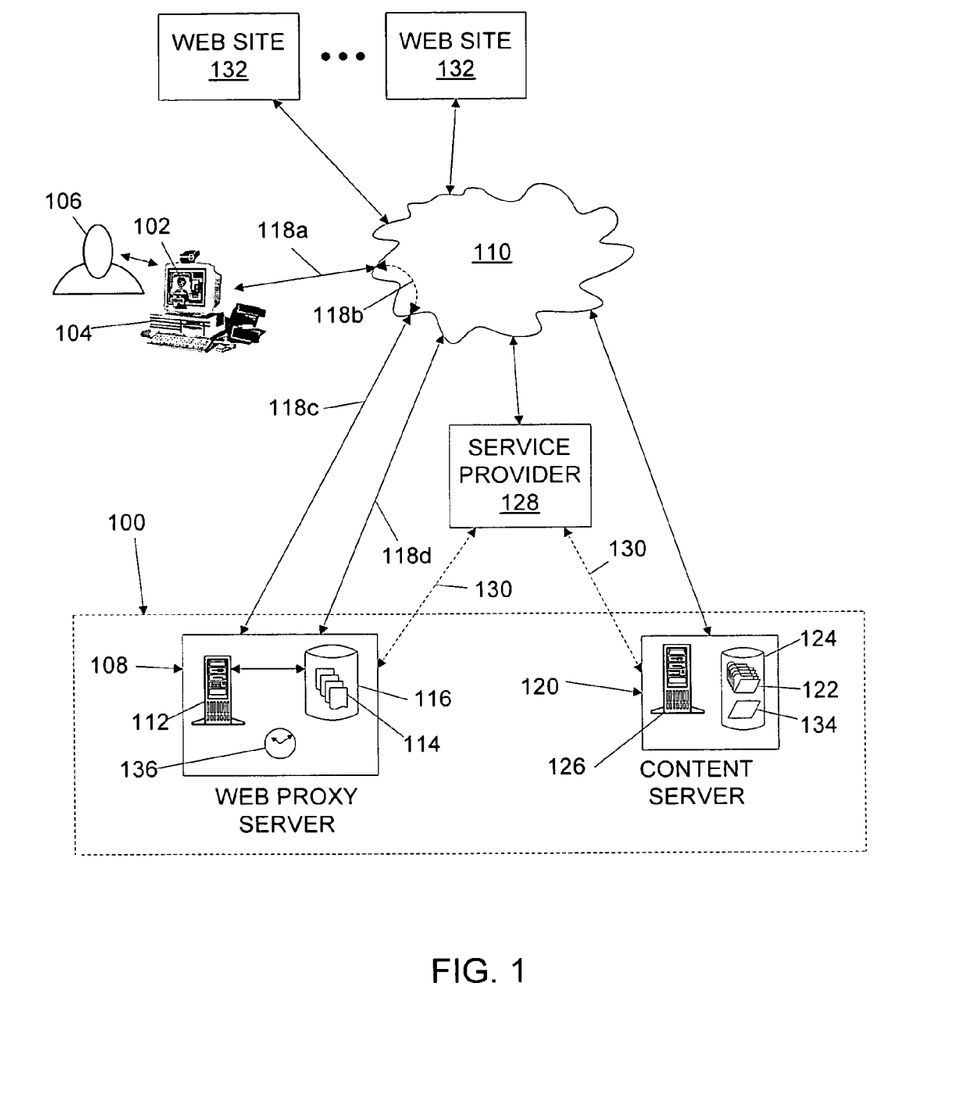
FIG. 1 illustrates a block diagram of a system for providing Web pages to a user's Web browser.

Referring to FIG. 1, there is shown a block diagram of a system 100 that can provide Web pages to browser 102 running on processor 104 of user 106. System 100 can include one or more Web proxy servers 108 connected to a network 110, such as the Internet. Proxy server 108 can include a processor 112 that can execute one or more sets of instructions, or programs 114 contained on storage medium 116. Proxy server 108 can act as a mediator between Web browser 102 and network 110. Thus, the user connection to network 110, as shown by arrows 118a-d, can include a connection 118a from user processor 104 to network 110, a connection 118b through network 110 directly to the connection 118c from network 110 to proxy server 108 and the connection 118d from proxy server 108 to network 110. Connections 118c and 118d can be configured as a single connection and connections 118c and 118d can be shown as separate connections in FIG. 1 for illustrative purposes.

In one embodiment, proxy server 108 can be configured in the manner of known Web servers in that proxy server 108 can receive and process requests from Web browsers such as browser 102. Depending on the workload experienced by proxy server 108, one or more execution instances of proxy server 108 can be used. Instructions or programs 114 of proxy server 108 can include load-balancing techniques for distributing the workload across the execution instances. In one embodiment, proxy server 108 can include a network device, such as a router. However, it can be understood that proxy server 108 can perform application layer packet inspection and process Web network traffic using Hypertext Transfer Protocol (HTTP) and/or other protocols for processing requests from users.

One or more content servers 120 of system 100 can include template forms 122 on storage medium 124, from which processor 112 of proxy server 108 can generate a Web page. It can be understood that proxy servers 108 can be configured to include content servers 120. In one embodiment, content server 120 can include processor 126 for processing requests for Web pages and generating the Web pages. In one embodiment, service provider 128 can establish proxy servers 108 and content servers 120, as indicated by dashed arrows 130 in FIG. 1, to mediate its customers' access to network 110 and provide Web pages to its customers, such as user 106.

Figure 2:
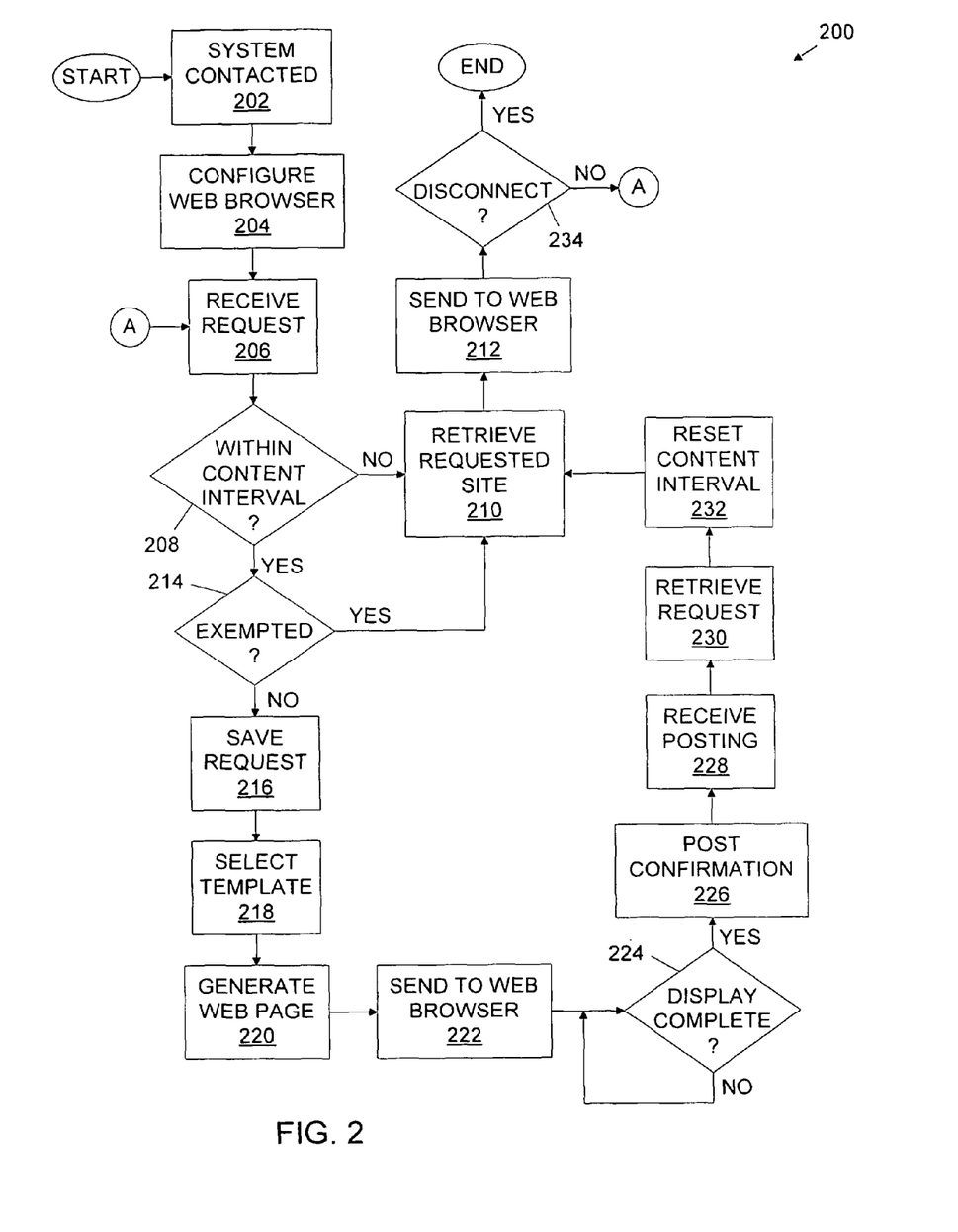
FIG. 2 illustrates a flow chart of a method implemented by the system of FIG. 1.

FIG. 2 illustrates a flow chart for a method 200 to generate and provide Web pages to a Web browser using the system 100. Method 200 can start when user 106 contacts (202) service provider 128 to utilize service provider 128 for access to Web sites 132 on network 110. Service provider 128 can facilitate configuration (204) of Web browser 102 for user 106 to address Web proxy server 108. In one embodiment, processor 104 can execute an application provided by service provider 128 for contacting service provider 128 and configuring browser 102.

Once Web browser 102 is configured to use Web proxy server 108, data traffic to and from Web browser 102 can pass through Web proxy server 108, where processor 112 can alter the data flow to provide Web pages to browser 102. Proxy server 108 can receive a request, e.g., for a URL, from user 106 to access a Web page or site, as at 206. Method 200 can determine (208) whether the Web site request arrived within a predetermined content interval. The content interval can include a measure or value defined in the Web proxy server for user 106, which can indicate when a Web page can be provided to browser 102.

In one embodiment, the measure can include a time value that can correspond to the minimum time period between providing Web pages to browser 102. As an example, the content interval can be 15 minutes when proxy server 108 receives an initial request from a user. Within a 15 minute time period from the request, proxy server 108 can allow Web page requests to be processed by the respective servers for the requested Web sites 132, similar to user 106 accessing the network 110 without using Web proxy server 108. When 15 minutes have elapsed, a request can trigger system 100 to provide a Web page based on a template form 122 from content server 120.

Other time measures can be used, including average time between provisions and maximum time between provisions. Measures other than time measures can be used, including ratios of provided content Web pages to URL accessed Web sites. For example, one content Web page can be provided for every ten URL accessed Web sites or pages. In one embodiment, the measure can correspond to receiving a request for a predetermined Web site, with every request being checked to determine if the predetermined site is requested. The measures for Web pages accessed from within a single domain (e.g., accessing site xyzl.com/first from xyzl.com/second in the xyzl.com domain) can be different from the measures for Web pages accessed by changing domain (e.g., accessing site xyzl.com/first from abc2.com). For example, the measure for Web pages accessed from within a single domain can be a time measure, while the measure for Web pages accessed by changing domains can be a ratio, as previously described. In another example, the ratio for Web pages accessed from within a single domain can be different from the ratio for Web pages accessed by changing domains.

Time and other measures can be combined, such that more than one measure can trigger provision of a content Web page. The measures can be different for different users and can be dynamically changed for a user. For example, during configuration, a user can choose a range of services from service provider 128 from a low cost service with a short time interval between Web page provisions to a high priced service with long time intervals between Web page provisions. Web proxy server 108 can maintain a state that defines whether the content interval is active or non-active for the user based on the time value or content interval.

If the request did not arrive during a content interval, proxy server 108 can retrieve (210) the requested Web site from network 110 and send (212) the requested Web site or page to browser 102 of user 106. If the request arrived during a content interval, method 200 can determine (214) if the requested Web site is exempted from having a Web page provided prior to the requested Web site or page. If the requested Web site or page is exempted, method 200 can proceed to 210 to retrieve the Web site or page.

Exempted Web sites or pages can include Web sites or pages so designated by user 106 during configuration, or so designated by system 100 based on criteria determined by system 100. For example, system 100 can exempt the Web sites of companies providing content to service provider 128, such that user 106 is not interrupted while accessing those Web sites. In another example, the content Web page can contain a link to another Web site and/or page that can be exempted.

If the request arrived during a content interval and the requested Web site is not exempted, proxy server 108 can save (216) the request and select (218) a content template form from content server 120. A content Web page can be generated (220) from the selected template and sent (222) to Web browser 102 of user 106. Hence, a content Web page can be displayed on Web browser 102 instead of the Web page requested by user 106. The template forms can be configured such that the content Web page can be specifically tailored to user 106 based on the configuration data 134 obtained from user 106. Such data can include demographic data, user preference data, and other data useful for marketing to user 106. In one embodiment, storage medium 124 can include configuration data 134.

The content Web page can be displayed on Web browser 102 until a predetermined trigger occurs. The trigger can include exceeding a predetermined time, the completion of an action associated with the content Web page, and/or performance of a specified act by user 106. For example, the content Web page can include a video clip and the content Web page can be displayed until the video clip is complete. As another example, the content page can provide user 106 with an option to purchase an item. The act of user 106 inputting purchase and payment information can trigger removal of the content Web page from browser 102.

In one embodiment, proxy server 108 can include a tracking device 136 (FIG. 1) that can monitor the content Web page for the occurrence of the trigger. For example, tracking device 136 can include a timer to determine when the predetermined time is exceeded. In one embodiment, the content Web page can contain JavaScript (a registered trademark of Sun Microsystems, Inc.) that can be initiated by the occurrence of the trigger, e.g., the completion of the video clip, an action by user 106, or some external event (e.g. the timer of tracking device 136), depending on the design of the content Web page.

When the display of the content Web page is complete, as determined at 224 by one of the above or another predetermined trigger, the JavaScript, or other set of instructions can post a confirmation to proxy server 108, or otherwise notify proxy server 108, as at 226. The posting can include time of access, actions taken by user 106, and/or other data that a content provider can use for marketing research or other purposes. The posting can be included with the configuration data 134 for use in generating the content Web page.

When proxy server 108 receives the posting (228), the saved request can be retrieved (230), the content period interval can be reset (232), and method 200 can return to 210 to retrieve the requested site and send the requested Web page to browser 102, as at 212. Method 200 can end when user 106 disconnects from proxy server 108, as determined at 234. Otherwise method 200 can await receipt of additional Web page or site requests, as indicated at "A".

The content Web page can include a combination of various media types such as audio and video clips, animated graphics, Macromedia Flash® (Macromedia, Inc.), on-line games, and Hypertext Markup Language (HTML). The video clips, audio clips, graphics, etc. can be stored with the templates 122 in content server 120. In one embodiment, processor 126 can serve as a videoserver and/or music server to stream video and/or audio content to Web browser 102. During configuration, system 100 can ensure that Web browser 102 can include appropriate media viewers and players to receive and play streaming video and/or audio content.

Figure 4A:
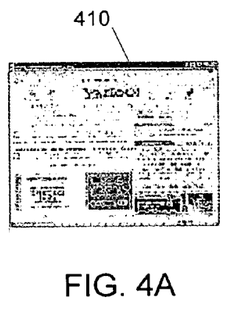
FIGS. 4A-4C illustrate a series of screen images on a Web browser including a Web page provided by the system of FIG. 1.
Figure 4B:
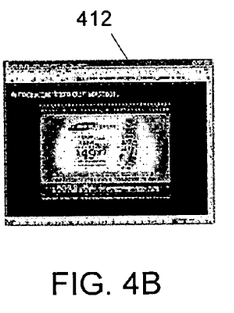
Figure 4C:
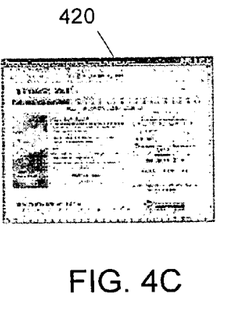

The content Web page can take a variety of forms, including an interposed content Web page and a pop-up content Web page, as known in the art. FIGS. 4A-4C illustrate a screen image sequence for an interposed content Web page. Screen 410 of FIG. 4A can correspond with screen 310 of FIG. 3A. When the request for a new Web page is received during the content period interval, e.g., a request for the Web page illustrated by screen 320 of FIG. 3B, the interposed Web page replaces the previous Web page of screen 410, as seen by screen 412 in FIG. 4B. When the display of the interposed Web page of screen 412 is complete, the requested Web page can be displayed, as indicated by screen 420 of FIG. 4C, corresponding with screen 320 of FIG. 3B.

Figure 5A:
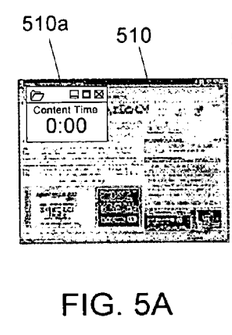
FIG. 5A-5C illustrate a series of screen images on a Web browser including a Web page overlay provided by the system of FIG. 1.
Figure 5B:
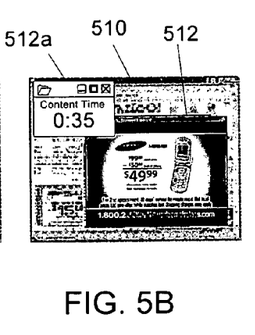
Figure 5C:
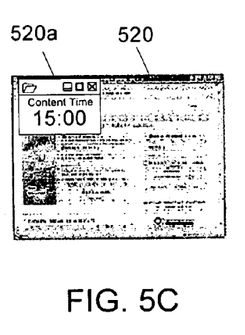

FIGS. 5A-5C illustrate a screen image sequence for a pop-up Web page. Screen 510 of FIG. 5A can correspond with screen 310 of FIG. 3A. When the request for a new Web page is received during the content period interval, e.g., a request for the Web page illustrated by screen 320 of FIG. 3B, the pop-up Web page screen 512 of FIG. 5B can overlay the Web page of screen 510. When the display of the pop-up Web page screen 512 is complete, the requested Web page can be displayed, as indicated by screen 520 of FIG. 5C, corresponding with screen 320 of FIG. 3B. Alternatively, when the request for a new Web page is received during the content period interval, the requested Web page can be displayed with Web page screen 512 overlaying Web page screen 520 until the display of pop-up Web page screen 512 is complete. As with screen images 310, 320 and 330 of FIGS. 3A-3C, the screen images in FIGS. 4A-4c (screen images 410, 412 and 420) and in FIGS. 5A-5C (screen images 510, 512 and 520) are intentionally shown blurred to illustrate Web pages without disclosing the actual content thereof.

In one embodiment, the content Web page can include a window to inform user 106 of the status of the content period interval, e.g., by showing the time remaining before the start of the next content period interval, the number of Web sites that can be accessed before the start of the next content period interval, and/or the time remaining until the content Web page is removed. As an example, FIG. 5A illustrates window 510a in screen 510, showing no time remaining, such that the next user request for a Web page or site will trigger method 200. In screen 510/512 of FIG. 5B, window 512a can indicate 0:35 remaining until the content Web page is complete and the user requested page is retrieved. In screen 520, window 520a can indicate 15:00 remaining until a content Web page is provided. In another example, the time can be displayed in the system tray by properly configuring processor 104 of user 106, as known in the art. It can be understood that other means of tracking and displaying the time, as may be known in the art can be utilized with system 100.

System 100 and method 200 can enable service provider 128 to become a distributor of content, including advertising content, similar in that regard to current Web content providers. However, the systems and methods described herein can provide a number of improvements and/or advantages over current systems and methods for providing content over a network, and particularly advertising content.

First, the systems and methods described herein can afford the ability to provide a content Web page to the user's Web browser at predetermined time intervals independent of the Web site being accessed by the user. Unlike current systems implementing banner advertisements requiring the user to access a specific Web site before the banner can be displayed, Web proxy server 108 can determine which content to display and under what circumstances they can be displayed, independent of the user's action.

In addition, method 200 can determine at 224 whether a content Web page has been viewed in its entirety. The template forms 222 can provide targeted content and the timing of providing the content can be customized for the user. Users' experience with television commercials can prepare them for the provision of the content web pages. The systems and methods can operate on a variety of networks, including networks supporting the Internet Protocol (IP), broadband networks, DSL (Digital Subscriber Line), FTTP (Fiber to the Premise), and WiFi (a wireless network specification).

The systems and implementations thereof described herein may not be limited to particular components or configurations. For example, system 100 can be distributed among a number of network nodes that can communicate and cooperate over network 110, such as an intranet and/or the Internet, to provide users with a seamless interface experience. In addition, browser 102 can be configured to operate on a number of devices capable of accessing system 100 through network 110, including personal computers, wireless phones, PDA's and the like.

Processors 104, 112 and/or 126 can include volatile memory and non-volatile memory, e.g., storage medium 116 and 124, for storing data, such as template forms 122, and other data corresponding to input and output values and other intermediate computations for the method 200. The memory can include instructions for executing the method 200, which can be transferred, in the course of operation, from the non-volatile memory to the volatile memory and to the processor for execution.

Additionally, the flow chart of FIG. 2 can illustrate an exemplary implementation of method 200 and other configurations can be contemplated and/or other actions, decisions, menus and the like can be included, as for example the provision of windows 510a, 512a and 520a described herein. Also, it can be understood that processors 104, 112, and/or 126 can include and/or be combined into one or more processors for interfacing with user 106, service provider 128, and the like, and for performing method 200. Further, it can be understood that storage medium 116 and/or 124 can be combined and/or distributed among one or more storage mediums accessible by processors 104, 112 and/or 126.

The systems and methods described herein may not be limited to a particular hardware or software configuration; they may find applicability in many computing or processing environments. They can be implemented in hardware or software, or a combination thereof. Preferably, method 200 can be implemented in computer programs executing in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method, comprising:
    receiving, by a computer system, a request for a first Web page, the request being received from a user device;
    determining, by the computer system, whether said request was received during a content interval;
    retrieving, by the computer system, a content Web page in response to said request when it is determined that said request was received during the content interval,
    where the content interval is based on a predetermined ratio of retrieved content Web pages to non-content Web pages;
    sending, by the computer system, said content Web page to a browser of the user device for display of said content Web page for a predetermined period;
    providing, by the computer system, a first indication of a status of said content interval to said browser for display by said browser of the user device;
    retrieving, by the computer system, said first Web page when said predetermined period is exceeded;
    sending, by the computer system, said first Web page to said browser of the user device for display of said first Web page; and
    providing, by the computer system and for display by the browser of the user device, a second indication of at least one of a time remaining until a start of a next content interval or a number of Web sites that can be accessed before the start of the next content interval, the second indication being provided while the first Web page is being displayed by the browser of the user device.

2. The method of claim 1, comprising:
    saving said request to obtain a stored request; and
    retrieving said stored request to determine retrieval information for retrieving said first Web page.

3. The method of claim 1, where retrieving said first Web page after retrieving and sending said content Web page comprises resetting said content interval.

4. The method of claim 1, comprising retrieving and sending said content Web page in response to said request based on said first Web page being non-exempt.

5. The method of claim 1, where retrieving said content Web page comprises:
    selecting a template form for said content Web page; and
    generating said content Web page from said template form.

6. The method of claim 5, where selecting said template form comprises:
    obtaining configuration data from users of the web browser; and
    selecting said template form based on said configuration data.

7. The method of claim 1, comprising determining when said predetermined period is exceeded based on a triggering event, said triggering event including selection of an action specified on said content Web page.

8. The method of claim 7, where retrieving said content Web page comprises:
    obtaining configuration data from users of the web browser;
    selecting a template form for said content Web page based on said configuration data; and
    generating said content Web page from said template form.

9. The method of claim 8, comprising:
    obtaining triggering data from said triggering event; and
    incorporating said triggering data with said configuration data.

10. The method of claim 7, comprising retrieving and sending said content Web page in response to said request based on said first Web page being non-exempt.

11. The method of claim 7, where retrieving said first Web page after retrieving and sending said content Web page comprises resetting said content interval.

12. The method of claim 1, where retrieving said content Web page comprises:
    obtaining configuration data from a user of the web browser;
    selecting a template form for said content Web page based on said configuration data; and
    generating said content Web page from said template form.

13. The method of claim 12, comprising:
    obtaining triggering data from a triggering event; and
    incorporating said triggering data with said configuration data.

14. The method of claim 1, where sending said content Web page comprises replacing a previous Web page displayed by said browser with said content Web page.

15. The method of claim 1, where sending said content Web page comprises overlaying said content Web page on a previous Web page displayed by said browser.

16. The method of claim 1, comprising providing a status indication regarding said sending of said content Web page to said browser for display.

17. A computer-readable memory device containing instructions for controlling a computer system to provide a Web page to a Web browser, said instructions controlling said computer system to:
    receive a request for a first Web page;
    determine whether the first Web page is a non-exempt page;

determine whether said request is received during a content interval, the content interval being based on a predetermined ratio of retrieved content Web pages to non-content Web pages;

retrieve a content Web page in response to said request when the first Web page is a non-exempt page and when said request is received during the content interval;

send said content Web page to said browser for display of said content Web page for a predetermined period;

provide an indication of a status of said predetermined period to said browser, where said browser displays said indication;

retrieve said first Web page when said predetermined period is exceeded; and send said first Web page to said browser for display of said first Web page; and provide, for display by the browser, a second indication of at least one of a time remaining until a start of a next content interval or a number of Web sites that can be accessed before the start of the next content interval, the second indication being provided while the first Web page is being displayed by the browser.

18. The computer-readable memory device of claim 17, where said instructions include instructions for controlling said computer system to:
save said request to obtain a stored request; and
retrieve said stored request to determine retrieval information for retrieving said first Web page.

19. The computer-readable memory device of claim 17, where said instructions include instructions controlling said computer system to determine when said predetermined period is exceeded based on a triggering event, said triggering event taken from a listing of events including completion of a presentation on said content Web page; selection of an action specified on said content Web page, and expiration of a specified time period.

20. The computer-readable memory device of claim 19, where said instructions to retrieve said content Web page include instructions controlling said computer system to:
obtain configuration data from users of the web browser;
select a template form for said content Web page based on said configuration data; and
generate said content Web page from said template form.

21. The computer-readable memory device of claim 20, where said instructions include instructions controlling said computer system to:
obtain triggering data from said triggering event; and
incorporate said triggering data with said configuration data.

22. The computer-readable memory device of claim 17, where said instructions to send said content Web page include instructions controlling said computer system to replace a previous Web page displayed by said browser with said content Web page.

23. The computer-readable memory device of claim 17, where said instructions to send said content Web page include instructions controlling said computer system to overlay said content Web page on a previous Web page displayed by said browser.

24. A Web-based server application on a computer-readable memory device, said application comprising instructions to provide content Web pages to a Web browser at a predetermined interval, said application providing said Web pages by:
determining if a request for a first Web page from said Web browser is received during one of said predetermined interval;

obtaining configuration data from a user of said Web browser;

selecting a template form for said content Web page based on said configuration data when said request is received during said predetermined interval;

generating one of said content Web pages from said selected template form, where said predetermined interval includes a predetermined ratio of generated content Web pages to retrieved non-content Web pages;

sending said one of said content Web pages to said Web browser for display of said one of said content Web pages for a predetermined period;

retrieving said first Web page when said predetermined period is exceeded;

sending said first Web page to said Web browser for display of said first Web page; and providing, for display by the Web browser, an indication of at least one of a time remaining until a start of a next predetermined interval or a number of Web sites that can be accessed before the start of the next predetermined interval, the indication being provided while the first Web page is being displayed by the Web browser.

25. The application of claim 24, where said application comprises instructions to determine when said predetermined period is exceeded based on a triggering event, said triggering event taken from a listing of events including completion of a presentation on said content Web page, selection of an action specified on said content Web page, and expiration of a specified time period.

26. The application of claim 25, where said application comprises instructions to:
obtain triggering data from said triggering event; and
incorporate said triggering data with said configuration data.

27. A method of providing Web pages comprising:
receiving, by a computer system, a request for a first Web page, the request being received from a user device;
determining, by the computer system, if said request is received during a predetermined interval;
obtaining, by the computer system, configuration data from users;
selecting, by the computer system, a template form for a content Web page based on said configuration data;
generating, by the computer system, said content Web page from said template form when said request is received during said predetermined interval;
providing, by the computer system and to the user device, said content Web page in response to said request when said request is received during said predetermined interval,
where said predetermined interval includes one of a first predetermined time interval since an initial request has been received, a second predetermined time interval between successive content Web page retrievals, or a predetermined ratio of provided content Web pages to non-content Web pages;
receiving, by the computer system, an indication that display of said content Web page is complete;
providing, by the computer system and to the user device, said first Web page upon receipt of said indication; and
providing, by the computer system and for display by the user device, an indication of at least one of an amount of time remaining until a start of a next predetermined interval or a number of Web sites that can be accessed before the start of the next predetermined interval, the indication being provided while the first Web page is being displayed by the user device.

28. The method of claim 27, where receiving an indication comprises at least one of completion of a presentation on said content Web page, selection of an action specified on said content Web page, or expiration of a specified time period.

29. The method of claim 27, comprising providing a status indication relative to said predetermined interval to said browser for display.

30. A system for advertising over a network comprising:
a computer system connected to said network to receive a request from a user of said network to access a requested web page on said network;
a plurality of template forms for said advertising;
obtaining means to obtain configuration data from the user;
selecting means to select a template form from the plurality of template forms based on said configuration data;
determining means to determine if said request is received within a predetermined interval;
generating means to generate an advertising web page from said selected template form and to provide said advertising web page to said user when said request is received within said predetermined interval,
where said predetermined interval includes one of a first predetermined time interval since an initial request has been received from the user, a second predetermined time interval between successive advertising web page provisions, or a predetermined ratio of provided advertisement web pages to non-advertisement web pages;
tracking means to monitor provision of said advertising web page and to determine when said provision is complete;
processing means to provide said requested web page to said user when said provision is complete; and
means for providing, for display to the user, an indication of at least one of a time remaining until a start of a next predetermined interval or a number of Web sites that can be accessed before the start of the next predetermined interval, the indication being provided while the requested web page is being displayed to the user.

31. The system of claim 30 comprising windowing means to provide a status indication relative to said predetermined interval to said user, the status indication indicating an amount of time remaining until the requested web page is provided to the user, the status indication being provided while the advertising web page is being provided.

* * * * *